April 1, 1947. W. E. MENZIES 2,418,235
ELECTRIC MOTOR CONTROL
Filed July 10, 1943

INVENTOR
WILLIAM E. MENZIES
BY
Spencer, Hardman et Fee
HIS ATTORNEYS.

Patented Apr. 1, 1947

2,418,235

UNITED STATES PATENT OFFICE 2,418,235

ELECTRIC MOTOR CONTROL

William E. Menzies, Dayton, Ohio, assignor to General Motors Corporation, Detroit, Mich., a corporation of Delaware Application July 10, 1943, Serial No. 494,196

5 Claims. (Cl. 172—279)

This invention relates to improvements in electrical control devices for electric motors providing the motive power for refrigeration or air conditioning apparatus.

It is among the objects of the present invention to provide a device of simple structure and design adapted to control the starting of an electric motor, protect it against damage by overload or abnormal running conditions and also to control operation of the motor in response to and in accordance with variations in temperature remote from the motor.

Further objects and advantages of the present invention will be apparent from the following description, reference being had to the accompanying drawings wherein a preferred form of the invention is clearly shown.

Figure 1:
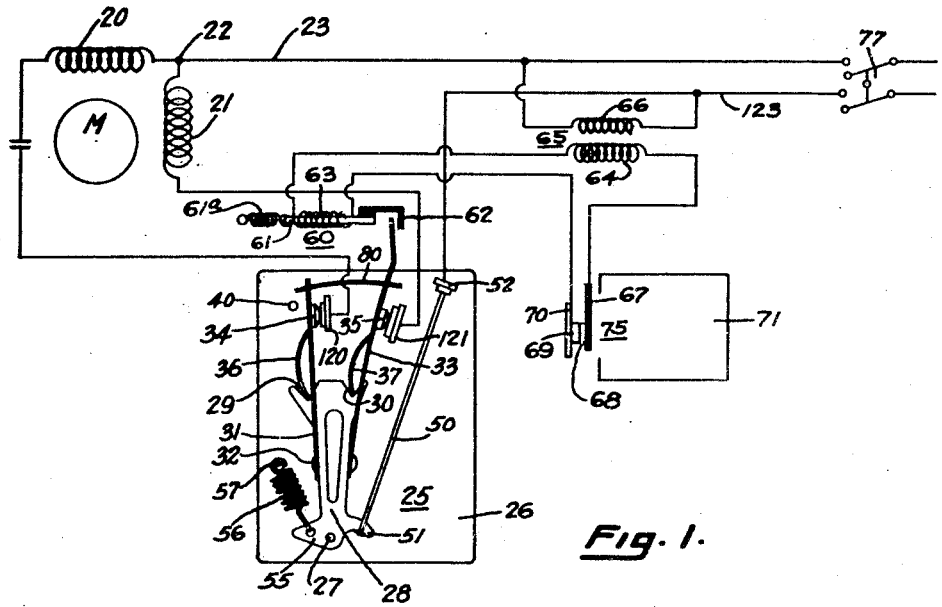
Fig. 1 is a diagrammatic view showing the preferred arrangement of the various parts of the device and their electrical connections.

Referring to the drawings, the electric motor M is provided with a starting winding 20 and a running winding 21. One end of each of these windings is connected to a motor terminal 22 to which one side 23 of the power line is attached. The other ends of these two motor windings 20 and 21 are connected respectively to the stationary contacts 120 and 121 of the motor control switch 25.

The motor control switch 25 is identical to the switch illustrated, described and claimed in the patent to C. J. Werner, 2,242,769, filed February 17, 1938, and issued May 20, 1941. It comprises an insulating base 26 supporting a pivot pin 27 upon which the frame 28 is pivotally mounted. The outer, free end of the frame has two V notches 29 and 30. A resilient blade 31 is secured to one side of the frame 28 by rivet 32. In a similar manner blade 33 is secured to the opposite side of the frame. A contact 34 is carried by blade 31 and a contact 35 by the blade 33. Contact 34 is adapted to engage stationary contact 120 carried by the insulating base 26 and contact 35 cooperates with stationary contact 121 also carried by the base. Blades 33 and 34 have integral, resilient fingers punched or struck therefrom, the finger of blade 31 being designated 36 and that of blade 33 being marked 37. When the frame 28 rotates in one direction to a certain point, say counter-clockwise, then the fingers exert a push on their respective blades to urge them clockwise or in a contact making direction. If on the other hand the frame is moved clockwise to a certain point, then the fingers 36 and 37 will urge their respective blades 31 and 33 counter-clockwise or in a contact separating direction.

Between the free ends of the blades 31 and 33 there is provided a spacer bar 80 which has reduced ends extending into openings in the respective blades. A stop 40 is carried by the base 26, said stop limiting the counter-clockwise or contact-separating movement of the blade 31. The spacer bar 80 acts as a limiting member for the counter-clockwise or contact-separating movement of the blade 33. Bar 80 also acts to move blade 33 clockwise under the influence of blade 31 which is the first one to move clockwise in response to counter-clockwise movement of the frame 28. As soon as the frame 28 reaches the point in its travel where the finger 36 will urge the blade 31 clockwise into contact making position, the blade 33 and its finger 37 will have reached a point so near their flipping position as to enable the blade 31, acting through bar 80, to throw blade 33 clockwise toward its stationary contact 121. This assures substantially simultaneous contact engagement. However, the separation of the two sets of contacts 34—120 and 35—121 is successive, the first mentioned set 34—120 being separated first, then, if conditions warrant, as will be explained, contacts 35 and 121 are separated.

A thermo-electric element or wire 50 has its one end mechanically and electrically attached to an extending ear 51 of the frame 28 adjacent its pivot pin 27. The other end of said element 50 is secured to a terminal 52 carried by the base 26.

An ear 55 on the frame 28, has one end of a spring 56 attached thereto, the other end of the spring being secured to any suitable anchorage 57 attached to the base 26. Spring 56 exerts a yieldable force urging the frame to rotate clockwise about its pivot post 27. The thermo-electric element 50 opposes this spring action and holds the frame against movement. This element is responsive to variations in temperature due to the heating effects of an electric current passing through it. As the element heats up due to the current flow it will expand and thus permit the spring 56 to move the frame 28 clockwise. As the element 50 cools, it contracts and thus moves the frame 28 counter-clockwise against the effect of the spring 56.

An electromagnetic actuator 60 is provided to actuate the switch 25 under certain circumstances. This actuator comprises a magnetic core 61 provided with an actuating finger 62 adapted to engage and actuate the contact blade 33 out of circuit making position. An energizing magnet winding 63 surrounds the core 61, one end of said winding being electrically connected to one end of the secondary winding 64 of a transformer 65. The primary winding 66 of said transformer is connected across the power lines 23 and 123. The other end of the secondary winding 64 of the transformer is electrically connected to the bimetallic blade 67 of a thermal switch 75. Blade 67 carries a contact 68 adapted to engage a contact 69 on the stationary blade 70 of the switch 75. Blade 70 is electrically connected to an end of the winding 63 of the electromagnetic actuator 60. The thermal switch is placed in thermal relation with member 71 which may be an evaporator when the device is installed in an electric refrigerator or it may be a room cooled by an air conditioning apparatus in which the device is installed. The ambient temperature controls the action of switch 75. When said temperature drops to a predetermined level the bimetal blade 67 flexes to cause its contact 68 to disengage contact 69 and on the contrary when the temperature rises to a predetermined point contacts 68 and 69 will be again engaged.

If, for instance, the element 71 is an evaporator in an electric refrigerator, and the temperature within the refrigerator and thus ambient to the evaporator 71 is predeterminately high, the contacts 68 and 69 of the switch 75 will be engaged as shown in Fig. 1. By closing the main power line switch 77 current from the power line is directed through the primary winding 66 of the transformer 65 energizing the secondary winding 64. With contacts 68 and 69 in engagement the following circuit is established: winding 64, contact blade 67, contacts 68 and 69, blade 70, magnet winding 63 back to the winding 64. This causes the electromagnet to be energized so that its core is attracted and moved against the effect of spring 61a to release the switch blade 33 so that it may engage its stationary contact 121. At the same time contact 34 on blade 31 engages the stationary contact 120. With these contacts 35—121 and 34—120 engaged the following motor circuits are completed: power line 123 to terminal 52, thermoelectric element 50, switch frame 28, blade 31, contacts 34—120, starting winding 20 of the motor to motor terminal 22 connected to power line 23. Also from switch frame 28, blade 33, contacts 35—121, running winding 21, motor terminal 22 and power line 23. Now the motor M will operate to drive the refrigeration apparatus, not shown, and while the motor operates the temperature ambient to the evaporator is gradually being reduced. The current flow through the blades 67 and 70 of switch 75 has a warming effect on the bimetal blade 67 causing it to flex and urge its contact 68 into engagement with contact 69 at an initially increased pressure whereby a temperature differential is obtained which eliminates the fluttering of blade 67 at slight temperature variations ambient to the evaporator 71 which would provide control over a much too limited range of temperature changes. With the present arrangement the motor M operates until a predetermined low temperature at the evaporator is reached, at which time the bimetal blade 67 flexes to separate its contact 68 from contact 69 thereby breaking the circuit including the magnet winding 63 and deenergizing the magnet, thus permitting the spring 61a to move the magnet core 61 so that its finger 62 engages blade 33 and moves it to open contacts 35—121. The tie bar 80 will, at the same time move blade 31 to open contacts 34—120. This breaks the motor winding circuits and renders the motor M inoperative to stop the refrigeration cycle. Gradually the temperature at the evaporator 71 rises and the bimetal blade 67 gradually flexes so that at a given high temperature contacts 68—69 are again engaged to cause energization of the electromagnet 60 to release blade 33 of switch 25.

When the contacts 34—120 and 35—121 of switch 25 are engaged and the main power line switch 77 is closed the motor windings 20 and 21 are energized to cause the motor to start. The heavy surge of starting current passing through the thermoelectric element 50 will cause it to be heated and heating thereof will result in its expansion. As the element 50 expands the spring 56 becomes effective to rotate the frame 28 clockwise about the pivot pin 27 thereby moving the point of engagement between the resilient finger 36 and bottom of notch 29 from the left of blade 31, as shown in Fig. 1, toward the right side thereof. As soon as this point of engagement passes from the left to the right side of blade 31, the resilient finger 36 will flip the blade 31 away from the stationary contact 120 toward and against the stop 40 thereby breaking the engagement of contact 34 with the stationary contact 120 and thus discontinuing the motor starting circuit. At this time, however, resilient finger 37 will still be to the left of blade 33 and will thus still hold contact 35 in engagement with stationary contact 121 to maintain the running circuit of the motor. Under normal running conditions the current flow through the thermo-electric is not sufficiently high to cause said element to become heated and expand so as to permit the spring 56 to shift the frame 28 clockwise and move the finger 37 so that it flips the blade 33 out of contact engagement. This occurs only when an abnormal current flow through the element 50 is established due to overload, short circuit or any other abnormal condition.

Figure 2:
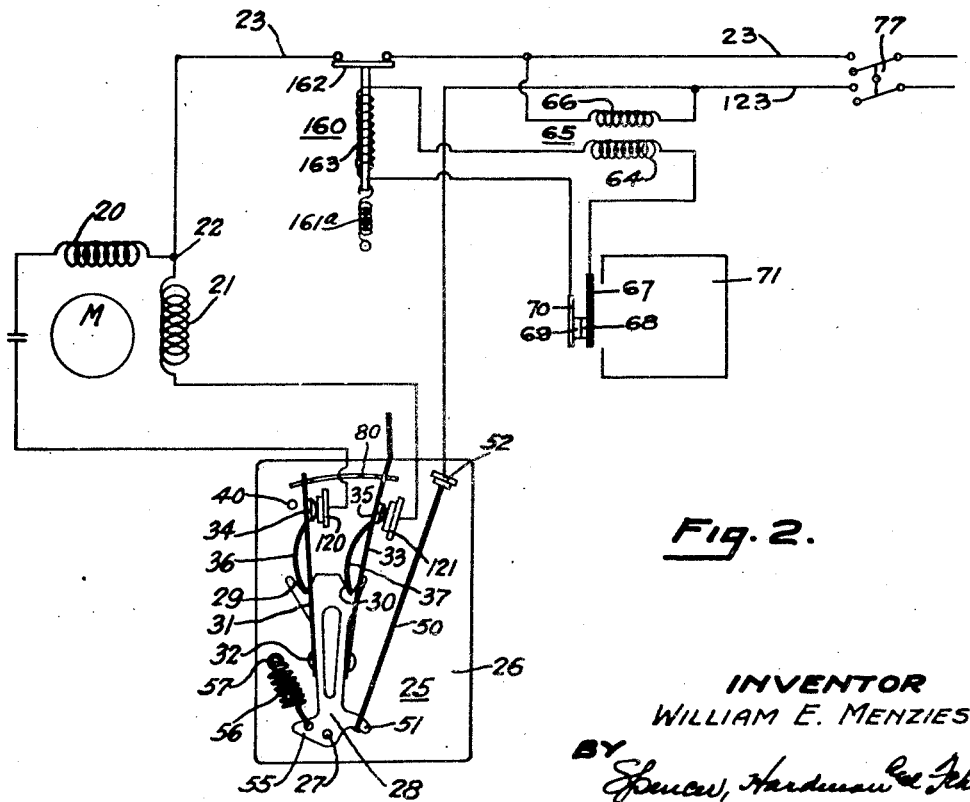
Fig. 2 is a similar view showing, however, a modified arrangement of the parts.

In the modified form of the invention as exemplified by Fig. 2 of the drawings, the electromagnetic switch 160 has a contact 162 which normally provides a gap in the power line 23. However, when the main power line switch 77 is closed and the transformer 65 energized, the electromagnet 160 will be energized, provided contacts 68 and 69 are engaged due to a predetermined high ambient temperature at the evaporator, whereby contact 162 of said electromagnet switch will close its power line gap and complete the circuit to the motor winding. However, as soon as contacts 68—69 are separated due to a predetermined low ambient temperature, the electromagnetic switch 160 is deenergized and the power line is again broken by the shifting of contact 161 by spring 161a.

In the preferred form of Fig. 1, the electromagnetic actuator carries only a light or low current supplied by a suitable transformer 65, while in the modified form of Fig. 2, the contact of the actuator is connected directly across the main power line of the motor.

The flow of current through the bimetal arm 67 of switch 75 occurs only when said arm has been flexed to cause contact engagement in response to a predetermined high ambient temperature. This flow has a heating effect on said bimetal arm which results in an initial increased closing pressure and thus a temperature differential is set up which will effect a belated opening of the switch 75. This eliminates what might be termed a balanced operation of the bimetal blade 67 under which conditions the blade would flutter between open and closed positions at slight temperature variations.

Being fed from a low voltage secondary of the transformer, switch 75 does not require the degree of insulation needed in case said switch were directly connected to the power line of the motor.

While the embodiment of the present invention as disclosed herein constitutes a preferred form, it is to be understood that other forms might be adopted, all coming within the scope of the claims which follow.

What is claimed is as follows:

1. Control apparatus for an electric motor having starting and running windings adapted to be connected to a source of electrical energy; a switch having cooperating contacts in circuit with said motor windings; a thermo-electric element for effecting operation of the switch to open or close said contacts in accordance with the current flow through said element; electromagnetic means yieldably urged to engage one of said contacts and hold it separated from its cooperating contact regardless of the effect of the thermo-electric element; and a thermal switch in circuit with the electromagnetic means and responsive to a predetermined temperature ambient to said thermal switch for effecting energization of the electromagnetic means to release the contact normally engaged by said means.

2. Control apparatus for an electric motor having starting and running windings adapted to be connected to a source of electrical energy; a switch having two sets of cooperating movable and stationary contacts each set being in circuit with a respective motor winding; a thermo-electric element mechanically connected to the switch and electrically connected in circuit with said sets of contacts, said element being effective to control the operation of the switch in accordance with current flow therethrough; a magnetic latch normally, yieldably urged to engage the movable contact of one set of contacts and hold it out of engagement with its cooperating stationary contact regardless of the effect of the thermo-electric element; and a thermal switch in circuit with the magnetic latch for effecting energization of the latch to release the contact normally engaged thereby, in response to a predetermined temperature ambient to said thermal switch.

3. Control apparatus for an electric motor having starting and running windings adapted to be connected to a source of electrical energy; a switch having two sets of cooperating movable and stationary contacts each set being in circuit with a respective motor winding; a thermo-electric element mechanically connected to the switch and electrically connected in circuit with said sets of contacts, said element being effective to control the operation of the switch in accordance with current flow therethrough; a latch yieldably urged into engagement with one of the movable contacts for rendering it inoperative by the movement of the switch under the effect of the thermo-electric element; a solenoid energizable to actuate the latch for releasing the movable contact engaged thereby; and a thermal switch, in circuit with the solenoid and effecting its energization in accordance with temperatures ambient to said thermal switch.

4. Control apparatus for an electric motor having starting and running windings adapted to be connected to a source of electrical energy; a switch having two sets of cooperating movable and stationary contacts each set being in circuit with a respective motor winding; a thermo-electric element mechanically connected to the switch and electrically connected in circuit with said sets of contacts, said element being effective to control the operation of the switch in accordance with current flow therethrough; a spring loaded latch normally engaging the movable contact of one set of contacts and holding it separated from its cooperating, stationary contact and inoperative by the thermo-electric element; means interposed between the latch engaged contact and the other movable contact to hold said other movable contact separated from its cooperating contact when the one movable contact is engaged by the latch; a solenoid for actuating the latch to release the movable contacts and render them operative under the effect of the thermo-electric element; and a thermal switch in circuit with the solenoid, for effecting energization of the solenoid to actuate the latch in accordance with predetermined temperatures ambient to said thermal switch.

5. Control apparatus for an electric motor having starting and running windings adapted to be connected to a source of electrical energy; a switch comprising a pivoted frame supporting two flexible contacts each adapted to engage a stationary contact in circuit with a respective motor winding; a thermo-electric element having one end attached to the switch frame for effecting its operation to open or close the contacts in accordance with the current flow through said element; a spring loaded detent yieldably urged into engagement with one of said flexible contacts to hold it disengaged from its stationary contact independently of the effect of the thermo-electric element; a solenoid energizable to move the detent for releasing the flexible contact normally engaged thereby; and a thermal switch, in circuit with the solenoid, for effecting control of the solenoid in accordance with the temperatures ambient to said thermal switch.

WILLIAM E. MENZIES.

REFERENCES CITED

The following references are of record in the file of this patent:

UNITED STATES PATENTS

| Number | Name | Date |
|---|---|---|
| 1,637,042 | Hutt | July 26, 1927 |
| 1,729,561 | Vaughn | Sept. 24, 1929 |
| 2,104,399 | Kuhn | Jan. 4, 1938 |
| 2,185,517 | Pearce | Jan. 2, 1940 |
| 2,203,927 | Rutherford | June 11, 1940 |
| 2,243,615 | Werner et al. | May 27, 1941 |
| 2,278,575 | Werner et al. | Apr. 7, 1942 |
| 2,317,630 | Menzies et al. | Apr. 27, 1943 |